US011358575B2

(12) United States Patent
Gerdes et al.

(10) Patent No.: US 11,358,575 B2
(45) Date of Patent: Jun. 14, 2022

(54) CONTROL DEVICE AND METHOD FOR OPERATING AN ELECTROMECHANICAL BRAKE BOOSTER OF A BRAKE SYSTEM CONFIGURED TO EXECUTE ANTI-LOCK CONTROL ACTIONS

(71) Applicant: Robert Bosch GmbH, Stuttgart (DE)

(72) Inventors: Manfred Gerdes, Vaihingen/Enz (DE); Patrick Christian Schaefer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 408 days.

(21) Appl. No.: 16/324,635

(22) PCT Filed: Jun. 8, 2017

(86) PCT No.: PCT/EP2017/063942
§ 371 (c)(1),
(2) Date: Feb. 11, 2019

(87) PCT Pub. No.: WO2018/036675
PCT Pub. Date: Mar. 1, 2018

(65) Prior Publication Data
US 2019/0193699 A1   Jun. 27, 2019

(30) Foreign Application Priority Data

Aug. 22, 2016 (DE) .......................... 102016215698.5

(51) Int. Cl.
*B60T 8/32* (2006.01)
*B60T 8/171* (2006.01)
(Continued)

(52) U.S. Cl.
CPC ............ *B60T 8/3265* (2013.01); *B60T 8/171* (2013.01); *B60T 8/172* (2013.01); *B60T 8/176* (2013.01);
(Continued)

(58) Field of Classification Search
CPC ........ B60T 8/3265; B60T 8/171; B60T 8/172; B60T 8/176; B60T 8/4077; B60T 8/44; B60T 13/746; B60T 8/17; B60T 2270/10
See application file for complete search history.

(56) References Cited

U.S. PATENT DOCUMENTS

2012/0265417 A1* 10/2012 Vollert ................. B60T 13/745
                                                        701/70
2013/0047593 A1*  2/2013 Weiberle .............. B60T 13/662
                                                        60/327
(Continued)

FOREIGN PATENT DOCUMENTS

CN      101208225 A      6/2008
CN      102256839 A     11/2011
(Continued)

OTHER PUBLICATIONS

International Search Report for PCT/EP2017/063942, dated Sep. 6, 2017.

*Primary Examiner* — Jelani A Smith
*Assistant Examiner* — Frank T Glenn, III
(74) *Attorney, Agent, or Firm* — Norton Rose Fulbright US LLP; Gerard Messina

(57) ABSTRACT

A control device and a method for operating an electromechanical brake booster of a brake system configured to execute anti-lock control actions, including the steps: determining a setpoint variable regarding a setpoint brake pressure to be produced by the electromechanical brake booster, in view of at least a differential travel; and controlling the electromechanical brake booster in view of the determined setpoint variable; at least during an anti-lock control action carried out in the brake system, it being ascertained if the differential travel lies outside of a specified normal value range, and in some instances, the additional steps being executed: determining a correction variable for the setpoint (Continued)

variable in view of at least a difference between the determined setpoint variable and an actual variable regarding an actual pressure present in at least part of the volume of the brake system, and controlling the electromechanical brake booster in additional view of the determined correction variable.

8 Claims, 3 Drawing Sheets

(51) Int. Cl.
*B60T 8/172* (2006.01)
*B60T 8/176* (2006.01)
*B60T 8/44* (2006.01)
*B60T 8/40* (2006.01)
*B60T 13/74* (2006.01)
*B60T 8/17* (2006.01)

(52) U.S. Cl.
CPC .............. *B60T 8/4077* (2013.01); *B60T 8/44* (2013.01); *B60T 13/746* (2013.01); *B60T 8/17* (2013.01); *B60T 2270/10* (2013.01)

(56) References Cited

U.S. PATENT DOCUMENTS

| | | | | |
|---|---|---|---|---|
| 2013/0289845 A1* | 10/2013 | Ajiro | ..................... | B60T 8/4077 701/70 |
| 2014/0319902 A1* | 10/2014 | Benzler | ................. | B60T 13/586 303/6.01 |
| 2015/0032352 A1* | 1/2015 | Butz | ........................ | B60T 8/17 701/70 |
| 2016/0207515 A1 | 7/2016 | Foitzik et al. | | |

FOREIGN PATENT DOCUMENTS

| | | | | |
|---|---|---|---|---|
| DE | 102010038555 A1 | 2/2012 | | |
| DE | 202010017605 U1 | 10/2012 | | |
| DE | 102013217579 A1 * | 3/2015 | ............ | B60T 13/745 |
| DE | 102013218330 A1 | 3/2015 | | |
| DE | 102014211551 A1 | 12/2015 | | |
| JP | 2008239142 A | 10/2008 | | |
| JP | 2012250709 A | 12/2012 | | |

* cited by examiner

CONTROL DEVICE AND METHOD FOR OPERATING AN ELECTROMECHANICAL BRAKE BOOSTER OF A BRAKE SYSTEM CONFIGURED TO EXECUTE ANTI-LOCK CONTROL ACTIONS

FIELD OF THE INVENTION

The present invention relates to a control device for an electromechanical brake booster of a brake system configured to execute anti-lock control actions. The present invention also relates to a brake system for a vehicle. Furthermore, the present invention relates to a method for operating an electromechanical brake booster of a brake system configured to execute anti-lock control actions.

BACKGROUND INFORMATION

An electromechanical brake booster and a method and a device for its operation are described in German Utility Model No. 20 2010 017 605 U1. In order to control/regulate the electromechanical brake booster, its motor is controlled with the aid of signals of a differential travel sensor for determining a differential travel of an input rod of the brake system equipped with the electromechanical brake booster and a booster body of the electromechanical brake booster.

SUMMARY

The present invention provides a control device for an electromechanical brake booster of a brake system configured to execute anti-lock control actions; a brake system for a vehicle; and a method for operating an electromechanical brake booster of a brake system configured to execute anti-lock control actions.

The present invention provides options for overcoming the conventional disadvantages of an electromechanical brake booster (such as an iBooster), which, as a rule, has a high stopping ability due to its comparatively high gear ratio and its relatively high gear friction, and therefore, according to the related art, is not able or is scarcely able to react elastically to high pressures in an adjacent master brake cylinder and/or in at least one master brake cylinder line connected to the master brake cylinder. Above all, in the case of anti-lock control action (ABS control), a relatively high volume of brake fluid is often pumped by at least one pump in the direction of the connected master brake cylinder within a comparatively short time, which means that the master brake cylinder and the at least one master brake cylinder line connected to it are put under pressure. At the same time, the driver mostly still applies the brakes by manipulating a brake actuating element (such as a brake pedal) connected to the master brake cylinder, into the master brake cylinder; the driver being assisted forcewise by corresponding operation of the electromechanical brake booster. Therefore, the operation of the electromechanical brake booster may normally contribute to an "unwanted pressure increase in the master brake cylinder and/or in the at least one master brake cylinder line," which, according to the related art, may damage the brake system. However, the present invention provides options for adapting the operation of the electromechanical brake booster to an anti-lock control action currently executed: In this context, the present invention takes into account that such adaptation of the operation of the electromechanical brake booster to the executed anti-lock control action is only necessary, if a comparatively high booster force is/is intended to be applied by the electromechanical brake booster, in order to increase pressure in the brake system. Consequently, an instance of underbraking due to unnecessary adaptation of/reduction in the operation of the electromechanical brake booster to the executed anti-lock control action in situations that do not require this, also does not have to be accepted.

Therefore, the present invention contributes towards preventing instances of underbraking or overloading of a brake system, in order to execute anti-lock control actions. Due to the instances of underbraking eliminated by the present invention, the driver may even decelerate/bring his or her vehicle to a dead stop more rapidly during the anti-lock control actions. In addition, the elimination of instances of overloading the brake system increases its service life and reduces repair costs.

A further advantage of the present invention is that a possibly executed adaptation of the operation of the electromechanical brake booster to the executed anti-lock control action is not carried out in view of an ascertained/estimated booster force of the electromechanical brake booster, but in view of the differential travel of the driver braking force transmission component and the booster force transmission component (that is, in view of the at least one sensor signal regarding the differential travel). While an ascertained/estimated value of the booster force frequently includes tolerances, as a rule, the differential travel (that is, the at least one sensor signal regarding the differential travel) may be ascertained/determined relatively free of tolerances.

In one advantageous specific embodiment of the control device, at least during the executed anti-lock control action, and if the differential travel is outside of the predefined range of normal values, the electronic device is configured to ascertain if the difference of the determined setpoint variable and the actual variable for at least a selected minimum time varies by, at most, a predefined, maximum difference. Only if the difference varies by, at most, the selected maximum difference for at least the predefined minimum time, is the electronic device configured to determine the correcting variable for the setpoint variable in view of at least the difference. Thus, this specific embodiment of the control device provides "temporal filtering" of the difference, in order to prevent unnecessary actions due to temporarily occurring differences.

Alternatively, or in addition to this, the control device may include a storage unit, in which a characteristic curve of the correcting variable as a function of the difference is stored. In some instances, the electronic device is configured to determine the correcting variable for the setpoint variable in view of at least the difference and the stored characteristic curve.

For example, the characteristic curve stored in the storage unit may be equal to zero for values of the difference within a predefined, first limiting value and a predefined, second limiting value. Consequently, differences within the specified low-difference range are tolerated, which means that the driver may continue to influence/vary a pressure produced in the master brake cylinder, using his/her driver braking force.

The advantages described above are also provided in a brake system for a vehicle, having such a control device, in the electromechanical brake booster, and in at least one brake pressure modulation unit, with the aid of which an anti-lock control action is executable.

In addition, execution of a corresponding method for operating an electromechanical brake booster of a brake system configured to carry out anti-lock control actions also provides the advantages already described above. It is expressly emphasized that the method according to the specific embodiments of the control device described above may be refined further.

DETAILED DESCRIPTION

Figure 1A:
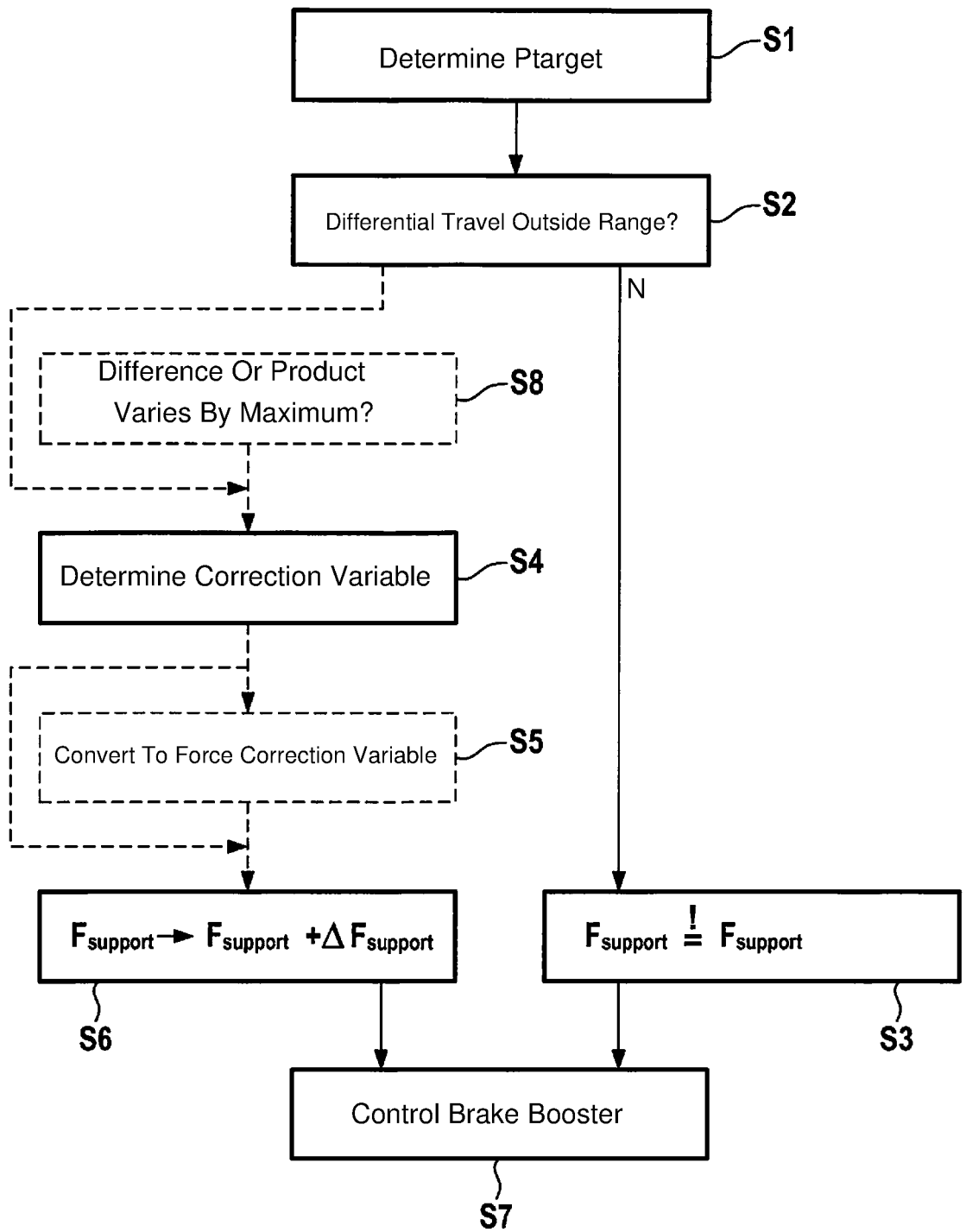
FIGS. 1a and 1b show a flow chart and a block diagram for explaining a specific embodiment of the method for operating an electromechanical brake booster of a brake system configured to execute anti-lock control actions.
Figure 1B:
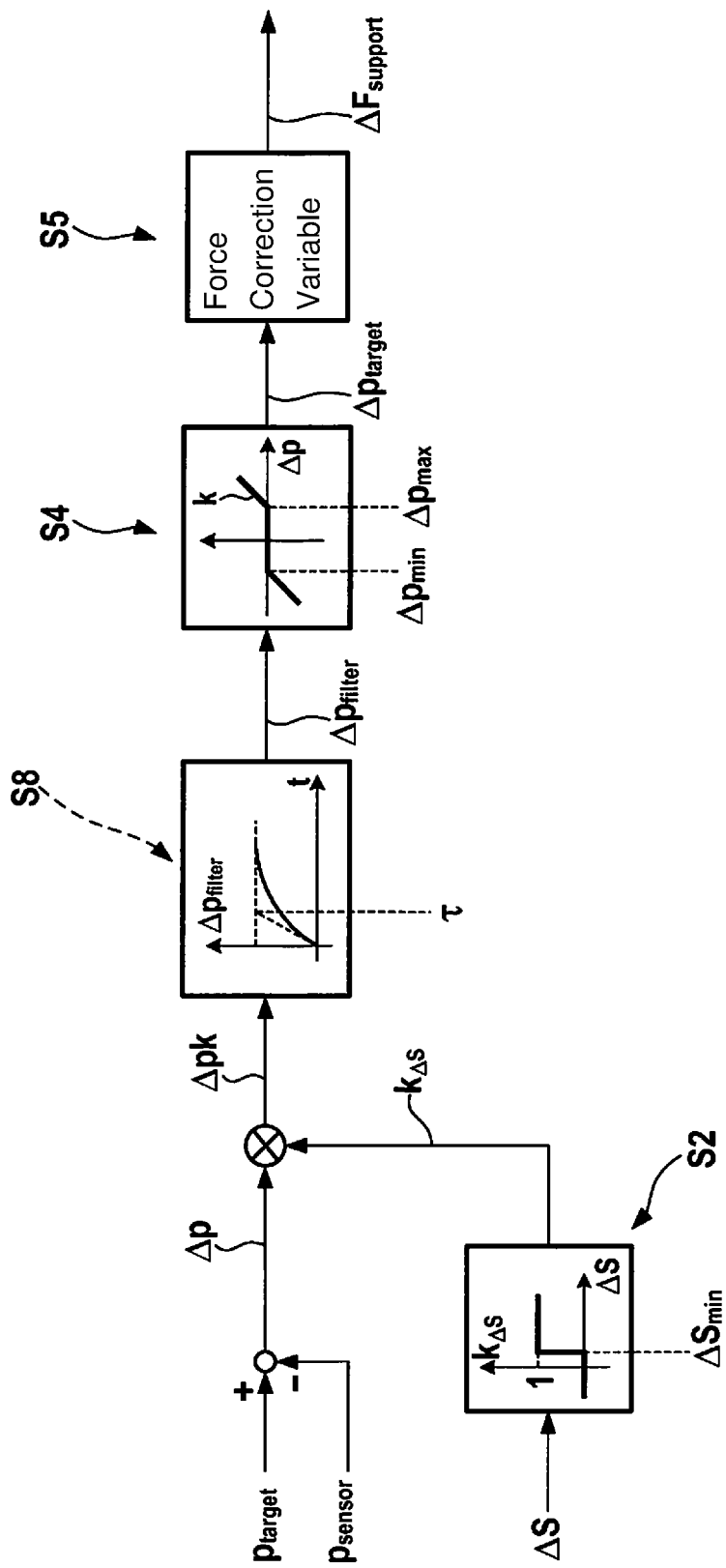

FIGS. 1a and 1b show a flow chart and a block diagram for explaining a specific embodiment of the method for operating an electromechanical brake booster of a brake system configured to execute anti-lock control actions.

The electromechanical brake booster operated by the method described here is understood to be a brake booster having an electric motor. The electromechanical brake booster is preferably connected in series, in such a manner, to a master brake cylinder of the brake system configured to execute anti-lock control actions, that at least one piston of the master brake cylinder is adjustable/adjusted via operation of the motor of the electromechanical brake booster, through which an internal pressure present in the master brake cylinder is increasable/increased. The electromechanical brake booster may be, in particular, an iBooster. However, it is emphasized that an ability to execute the method described here is not limited to any particular type of electromechanical brake booster. In the same way, the ability to execute the method described in the following is limited neither to a particular type of brake system equipped with the electromechanical brake booster, nor to a particular type of vehicle/motor vehicle equipped with the electromechanical brake booster.

In a method step S1, a setpoint variable $p_{target}$ regarding a setpoint brake pressure $p_{target}$ to be produced by the electromechanical brake booster is determined. In the example of FIGS. 1a and 1b, setpoint brake pressure $p_{target}$ (together with a corresponding setpoint booster force $F_{support}$ to be applied by the electromechanical brake booster) is determined. However, it should be pointed out that in method step S1, a different variable regarding the setpoint brake pressure $p_{target}$ to be produced by the electromechanical brake booster may also be determined as setpoint variable $p_{target}$, in place of setpoint brake pressure $p_{target}$.

Setpoint variable $p_{target}$ is determined in view of at least a differential travel ΔS of a driver braking force transmission component adjustable/adjusted via manipulation of a brake actuating element of the brake system (by a driver of the vehicle/motor vehicle equipped with it) and a booster force transmission component adjustable/adjusted via (the motor of) the electromechanical brake booster. Differential travel ΔS may also be described as a difference of an adjusting path of the driver braking force transmission component (produced via manipulation of the brake actuating element) and a travel path of the booster force transmission component (produced by the motor of the electromechanical brake booster). The driver braking force transmission component may be understood as a component of the electromechanical brake booster/brake system, via which a driver braking force applied by manipulation of the brake actuating element may be transmitted to the at least one piston of the master brake cylinder. The driver braking force transmission component may be, for example, an input rod. Accordingly, the booster force transmission component is to be understood as a component of the electromechanical brake booster/brake system, via which a (an actual) booster force applied by the motor of the electromechanical brake booster may be transmitted to the at least one piston of the master brake cylinder. In particular, the booster force transmission component may be a valve body and/or a boost body of the electromechanical brake booster.

However, in the method described here, a method step S2 is also executed at least during an anti-lock control action carried out in the brake system. In method step S2, it is determined if differential travel ΔS lies outside of a predefined normal value range/normal braking intensity range. The normal value range/normal braking intensity range includes values of differential travel ΔS in driving situations, in which the driver requests only a comparatively low/light brake pressure in wheel brake cylinders of his/her brake system (that is, relatively light braking/deceleration of his or her vehicle/motor vehicle). Thus, with the aid of method step S2, the driving situations, in which the driver demands a comparatively high brake pressure or relatively sharp braking/deceleration (for example, complete deceleration) during the executed anti-lock control action, may be detected.

If the driver only requests a relatively low brake pressure during the executed anti-lock control action, then, e.g., the driver depresses the brake pedal only lightly, so high pressures would scarcely be expected to occur in the master brake cylinder and/or in at least one master brake cylinder line connected to it, due to the simultaneously executed anti-lock control action. Consequently, damage to the brake system by high pressures/pressure spikes is then not to be feared. Thus, in such a situation, considerable, force-based assistance of the driver via unrestricted operation of the electromechanical brake booster is advantageous and contributes towards increasing the braking comfort for the driver.

However, if an anti-lock control action is executed during a request for a high brake pressure, for example, while the driver depresses the brake pedal very strongly, then high pressures/pressure spikes may occur in the master brake cylinder and/or in the at least one master brake cylinder line connected to it (due to the delivery of brake fluid to the master brake cylinder during the simultaneous, sharp brake application of the driver). However, such situations may be detected with the aid of method step S2; and by adjusting the operation of the electromechanical brake booster in a timely manner, it may be ensured that no damage to the brake system occurs.

During the execution of method step S2, differential value ΔS, and not the driver braking force or the (actual) booster force of the electromechanical brake booster, is considered/evaluated in an advantageous manner. Measuring the driver braking force often requires an additional sensor. In addition, as a rule, the driver braking force may only be estimated with a relatively limited accuracy. Direct measurement of the (actual) booster force of the electromechanical brake booster is hardly possible. (In particular, in the case of rapidly changing rotational speeds and/or considerable temperature fluctuations,) The (actual) booster force of the electromechanical brake booster may also only be estimated in view of estimation errors. Above all, manufacturing tolerances regarding the electromechanical brake booster have a considerable influence on the quality of an estimate of the (actual) booster force. In addition, as a rule, a gear unit having friction is connected in outgoing circuit to the electromechanical brake booster; the friction often being heavily dependent on a loading case and current environmental conditions. Therefore, the problems, described in this section, in measuring/estimating the driver braking force and/or the (actual) booster force, may be overcome by considering/evaluating differential travel ΔS in method step S2.

For example, the normal value range/normal braking intensity range utilized for evaluating differential travel ΔS may be specified by a threshold value $\Delta S_{min}$. (Therefore, a correction factor $k_{\Delta S}$ determined in method step S2 may be set equal to zero for a differential travel ΔS less than threshold value $\Delta S_{min}$ and equal to one for a differential travel ΔS greater than threshold value $\Delta S_{min}$.) A magnitude of threshold value $\Delta S_{min}$ may be, for example, ±0.5. Using such a threshold value $\Delta S_{min}$, the driving situations, in which adaptation/reduction of the operation of the electromechanical brake booster is advantageous for preventing damage to the brake system by excessively high pressures/pressure spikes, may be detected/filtered out reliably. However, it should be pointed out that an ability to execute method step S2 is not limited to any particular numerical value of threshold value $\Delta S_{min}$.

If differential travel ΔS is within the predefined normal value range, e.g., less than positive threshold value $\Delta S_{min}$ or greater than negative threshold value $\Delta S_{min}$, then the method may be continued at method step S3. However, if differential path ΔS lies outside of the specified normal value range, e.g., is greater than positive threshold value $\Delta S_{min}$ or less than negative threshold value $\Delta S_{min}$, then the method is continued at least at method step S4.

In method step S4, a correction variable $\Delta p_{target}$ for the setpoint variable $p_{target}$ is determined in view of at least a difference Δp between determined setpoint variable $p_{target}$ and an actual variable $p_{sensor}$ regarding an actual pressure $p_{sensor}$ present in at least part of the volume of the brake system. In particular, correction variable $\Delta p_{target}$ for setpoint variable $p_{target}$ may be determined in view of at least the difference Δp of determined setpoint variable $p_{target}$ and an actual variable $p_{sensor}$ regarding the internal pressure present in the master brake cylinder of the brake system (in the form of actual pressure $p_{sensor}$).

For example, correction variable $\Delta p_{target}$ for setpoint variable $p_{target}$ may be determined in view of at least the difference Δp and a predefined characteristic curve k of correction variable $\Delta p_{target}$ as a function of difference Δp. Characteristic curve k is preferably equal to zero for values of difference Δp (between determined setpoint variable $p_{target}$ and actual variable $p_{sensor}$) within a predefined, first limiting value $\Delta p_{min}$ and a predefined (greater), second limiting value $\Delta p_{max}$. Consequently, the driver has the option of influencing the master brake cylinder pressure unhindered within these limiting values $\Delta p_{min}$ and $\Delta p_{max}$, using his/her driver braking force. Characteristic curve k preferably increases strictly monotonically for values of difference Δp (between determined setpoint variable $p_{target}$ and actual variable $p_{sensor}$) greater than second limiting value $\Delta p_{max}$, and decreases strictly monotonically for values of difference Δp less than first limiting value $\Delta p_{min}$. Thus, in method step S4, as a function of difference Δp (between determined setpoint variable $p_{target}$ and actual variable $p_{sensor}$), a pressure increase value or pressure decrease value may be set as a correction variable $\Delta p_{target}$, about which setpoint variable $p_{target}$/setpoint brake pressure $p_{target}$ is to be varied.

In the method described here, correction variable $\Delta p_{target}$ is converted, in an optional method step S5, to a force correction variable $\Delta F_{support}$ of setpoint booster force $F_{support}$ (that is, to a pressure increase or pressure decrease value for setpoint booster force $F_{support}$). In a further method step S6, setpoint booster force $F_{support}$ is redetermined in accordance with the correction variable, force correction variable $\Delta F_{support}$. (Alternatively, setpoint variable $p_{target}$/setpoint brake pressure $p_{target}$ may be redetermined in accordance with correction variable $\Delta p_{target}$.) In contrast to method step S6, in method step S3 (if differential travel ΔS is within the specified normal value range), it is stipulated that a redetermination of setpoint booster force $F_{support}$ (and/or of setpoint variable $p_{target}$/setpoint brake pressure $p_{target}$) is omitted. After method step S3 or method step S6, in a method step S7, the electromechanical brake booster is controlled in view of specific setpoint booster force $F_{support}$ (that is, in view of specific setpoint variable $p_{target}$/specific setpoint brake pressure $p_{target}$).

Prior to method step S4, another method step S8 may optionally be executed, in which it is ascertained if difference Δp (between setpoint variable $p_{target}$ and actual variable $p_{sensor}$) or a product of difference Δp and correction factor $k_{\Delta S}$ varies by, at most, a predefined maximum difference, for at least a predefined minimum time τ. In this case, only if difference Δp varies by, at most, the specified maximum difference, for at least predefined minimum time τ, is correction variable $\Delta p_{target}$ for setpoint variable $p_{target}$ determined in view of at least the difference Δp (and/or a "temporally filtered" difference $\Delta p_{filter}$). With the aid of method step S8, short-term, extreme values of difference Δp may be filtered out, in order to prevent unnecessary actions. (Vehicle inertias may suppress short-term deviations automatically.) Minimum time τ may be 0.3 seconds, for example. The specified, maximum deviation may also be zero, so that in method step S8, it is checked if difference Δp (between setpoint variable $p_{target}$ and actual variable $p_{sensor}$) is constant for at least specified minimum time τ.

The method described here compensates for tolerances, in order to prevent overloading or underbraking. The method may be referred to as a simple adjusting method, by which the operation of the electromechanical brake booster is adapted to the executed anti-lock control action and the relatively sharp braking of the driver. At the same time, however, the compensation still allows the driver the option of controlling the internal pressure of the master brake cylinder over a broad range, using his/her driver braking force.

Figure 2:
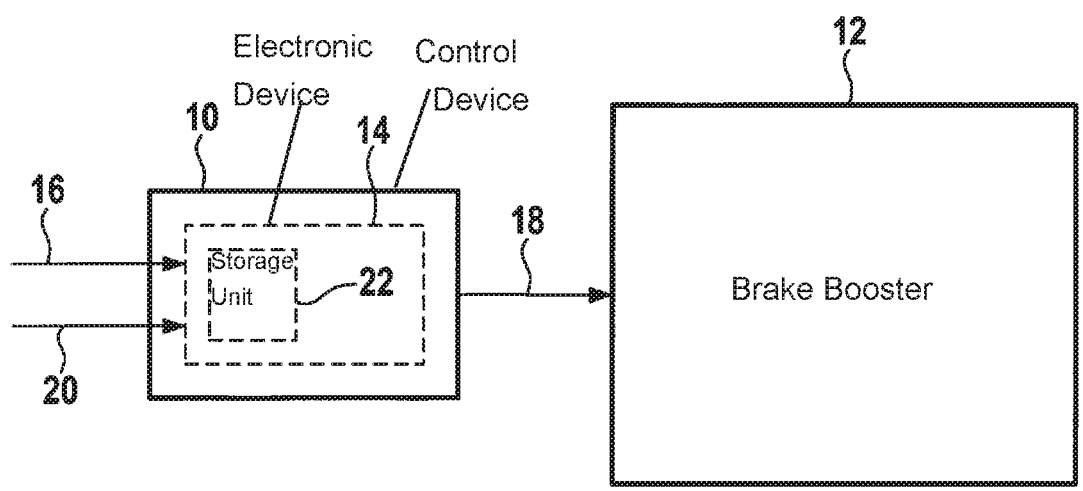
FIG. 2 shows a schematic representation of a specific embodiment of the control device.

FIG. 2 shows a schematic representation of a specific embodiment of the control device.

The control device 10 schematically represented in FIG. 2 is configured to interact with an electromechanical brake booster 12. Control device 10 may take the form of a subunit of electromechanical brake booster 12 or be separate from it. An ability to develop control device 10 is not limited to a particular type of electromechanical brake booster 12. In the same way, control device 10 may be used in many different types of brake systems, which are configured for carrying out anti-lock control actions, and in many different types of vehicles/motor vehicles.

Control device 10 includes an electronic device 14, which is configured to determine a setpoint variable regarding a setpoint brake pressure to be produced with the aid of electromechanical brake booster 12, at least in view of at least one supplied sensor signal 16 regarding a differential travel of a driver braking force transmission component adjustable via manipulation of a brake actuating element (, not shown,) of the brake system and a booster force transmission component adjustable with the aid of the electromechanical brake booster; the electronic device is also configured to control electromechanical brake booster 12 with the aid of at least one control signal 18, in view of the determined setpoint variable. Examples of the driver braking force transmission component and the booster force transmission component (of which both are not shown) are already mentioned above.

During at least an anti-lock control action executed in the brake system, electronic device 14 is additionally configured to ascertain if the differential travel lies outside of a specified normal value range. If at least the differential travel is outside of the specified normal value range, then electronic device 14 is configured to determine a correction variable for the setpoint variable in view of at least a difference of the determined setpoint variable and a supplied, actual variable 20 regarding an actual pressure present in at least part of the volume of the brake system; and the electronic device is configured to control electromechanical brake booster 12 (with the aid of the at least one control signal 18) in additional view of the determined correction variable.

Control device 10 advantageously includes a storage unit 22, in which a characteristic curve of the correcting variable as a function of the difference is stored. In this case, electronic device 14 is configured to determine the correcting variable for the setpoint variable in view of at least the difference and the stored characteristic curve. An example of an advantageous characteristic curve is already described above.

As an advantageous further refinement, electronic device 14 may also be configured to ascertain if the difference of the determined setpoint variable and the actual variable varies by, at most, a predefined, maximum difference for at least a specified minimum time. The correcting variable for the setpoint variable is only then determined in view of at least the difference, if the difference varies by, at most, the specified maximum difference for at least the specified minimum time. Further method steps of the method explained above may also be executed with the aid of control device 10/its electronic device 14.

The control device also provides the advantages already mentioned above. The advantages may also be provided by a brake system for a vehicle/motor vehicle, including control device 10, electromechanical brake booster 12 and at least one brake pressure modulation unit (not shown), with the aid of which an anti-lock control action may be carried out. The at least one brake pressure modulation unit may be, for example, at least one return pump.

What is claimed is:

1. A control device for an electromechanical brake booster of a brake system configured to execute anti-lock control actions, comprising:
    an electronic device for determining a setpoint variable regarding a setpoint brake pressure to be produced by the electromechanical brake booster, at least in view of at least one supplied sensor signal regarding a differential travel of a driver braking force transmission component adjustable via manipulation of a brake actuating element of the brake system and a booster force transmission component adjustable by the electromechanical brake booster, wherein:
    the electronic device controls the electromechanical brake booster in view of the determined setpoint variable;
    during at least an anti-lock control action executed in the brake system, the electronic device ascertains if the differential travel lies outside of a specified normal value range,
    if at least the differential travel lies outside of the specified normal value range, the electronic device determines a correction variable for the setpoint variable in view of at least a difference of the determined setpoint variable and a supplied actual variable regarding an actual pressure present in at least part of a volume of the brake system, and
    the electronic device controls the electromechanical brake booster in view of the determined correction variable, wherein:
    the control device includes a storage unit that stores a characteristic curve of the correction variable as a function of the difference, and
    the electronic device determines the correction variable for the setpoint variable in view of at least the difference and the stored characteristic curve.

2. The control device as recited in claim 1, wherein the characteristic curve stored in the storage unit is equal to zero for values of the difference within a specified, first limiting value and a specified, second limiting value.

3. A control device for an electromechanical brake booster of a brake system configured to execute anti-lock control actions, comprising:
    an electronic device for determining a setpoint variable regarding a setpoint brake pressure to be produced by the electromechanical brake booster, at least in view of at least one supplied sensor signal regarding a differential travel of a driver braking force transmission component adjustable via manipulation of a brake actuating element of the brake system and a booster force transmission component adjustable by the electromechanical brake booster, wherein:
    the electronic device controls the electromechanical brake booster in view of the determined setpoint variable;
    during at least an anti-lock control action executed in the brake system, the electronic device ascertains if the differential travel lies outside of a specified normal value range,
    if at least the differential travel lies outside of the specified normal value range, the electronic device determines a correction variable for the setpoint variable in view of at least a difference of the determined setpoint variable and a supplied actual variable regarding an actual pressure present in at least part of a volume of the brake system, and
    the electronic device controls the electromechanical brake booster in view of the determined correction variable, wherein:
    at least during the executed anti-lock control action, and if the differential travel lies outside of the specified normal value range, the electronic device ascertains if the difference of the determined setpoint variable and the actual variable varies by, at most, a predefined maximum difference, for at least a specified minimum time, and
    only if the difference varies by, at most, the predefined maximum difference, for at least the specified minimum time, the electronic device determines the correction variable for the setpoint variable in view of at least the difference.

4. A brake system for a vehicle, comprising:
    an electromechanical brake booster;
    at least one brake pressure modulation unit, with the aid of which an anti-lock control action may be executed; and
    a control device for the electromechanical brake booster of the brake system configured to execute anti-lock control actions, the control device including:
        an electronic device for determining a setpoint variable regarding a setpoint brake pressure to be produced by the electromechanical brake booster, at least in view of at least one supplied sensor signal regarding a differential travel of a driver braking force transmission component adjustable via manipulation of a brake actuating element of the brake system and a booster force transmission component adjustable by the electromechanical brake booster, wherein:

the electronic device controls the electromechanical brake booster in view of the determined setpoint variable;

during at least an anti-lock control action executed in the brake system, the electronic device ascertains if the differential travel lies outside of a specified normal value range, if at least the differential travel lies outside of the specified normal value range, the electronic device determines a correction variable for the setpoint variable in view of at least a difference of the determined setpoint variable and a supplied actual variable regarding an actual pressure present in at least part of a volume of the brake system, and the electronic device controls the electromechanical brake booster in view of the determined correction variable, wherein:

the control device includes a storage unit that stores a characteristic curve of the correction variable as a function of the difference, and the electronic device determines the correction variable for the setpoint variable in view of at least the difference and the stored characteristic curve.

5. A method for operating an electromechanical brake booster of a brake system configured to execute anti-lock control actions, comprising:

determining a set point variable regarding a setpoint brake pressure to be produced with the aid of the electromechanical brake booster, in view of at least a differential travel of a driver braking force transmission component adjusted via manipulation of a brake actuating element of the brake system and a booster force transmission component adjusted by the electromechanical brake booster; and controlling the electromechanical brake booster in view of the determined setpoint variable;

at least during an anti-lock control action executed in the brake system, ascertaining if the differential travel lies outside of a specified normal value range; and if the differential travel lies outside of the specified normal value range, performing the following:

determining a correction variable for the setpoint variable in view of at least a difference of the determined setpoint variable and an actual variable regarding an actual pressure present in at least part of a volume of the brake system, and controlling the electromechanical brake booster in additional view of the determined correction variable, wherein at least during the executed anti-lock control action, and if the differential travel exceeds the specified limiting differential travel, the correction variable for the setpoint variable is determined in view of at least the difference and a specified characteristic curve of the correction variable as a function of the difference.

6. The method as recited in claim 5, wherein:

a characteristic curve assigns 0 to values of the difference within a predefined, first limiting value and a predefined, second limiting value, and the characteristic curve is used for determining the correction variable for the setpoint variable.

7. A method for operating an electromechanical brake booster of a brake system configured to execute anti-lock control actions, comprising:

determining a set point variable regarding a setpoint brake pressure to be produced with the aid of the electromechanical brake booster, in view of at least a differential travel of a driver braking force transmission component adjusted via manipulation of a brake actuating element of the brake system and a booster force transmission component adjusted by the electromechanical brake booster; and controlling the electromechanical brake booster in view of the determined setpoint variable;

at least during an anti-lock control action executed in the brake system, ascertaining if the differential travel lies outside of a specified normal value range; and if the differential travel lies outside of the specified normal value range, performing the following:

determining a correction variable for the setpoint variable in view of at least a difference of the determined setpoint variable and an actual variable regarding an actual pressure present in at least part of a volume of the brake system, and controlling the electromechanical brake booster in additional view of the determined correction variable, wherein:

at least during the executed anti-lock control action, and if the differential travel lies outside of the specified normal value range, the correction variable for the setpoint variable is determined in view of at least the difference of the determined setpoint variable and the actual variable regarding an internal pressure present in a master brake cylinder of the brake system in the form of the actual pressure.

8. A method for operating an electromechanical brake booster of a brake system configured to execute anti-lock control actions, comprising:

determining a set point variable regarding a setpoint brake pressure to be produced with the aid of the electromechanical brake booster, in view of at least a differential travel of a driver braking force transmission component adjusted via manipulation of a brake actuating element of the brake system and a booster force transmission component adjusted by the electromechanical brake booster; and controlling the electromechanical brake booster in view of the determined setpoint variable;

at least during an anti-lock control action executed in the brake system, ascertaining if the differential travel lies outside of a specified normal value range; and if the differential travel lies outside of the specified normal value range, performing the following:

determining a correction variable for the setpoint variable in view of at least a difference of the determined setpoint variable and an actual variable regarding an actual pressure present in at least part of a volume of the brake system, and controlling the electromechanical brake booster in additional view of the determined correction variable, further comprising:

at least during the executed anti-lock control action, and if the differential travel lies outside of the specified normal value range, ascertaining if the difference of the setpoint variable and the actual variable varies by, at most, a predefined maximum difference for at least a specified minimum time; and only if the difference varies by, at most, the predefined maximum difference for at least the specified minimum time, determining the correction variable for the setpoint variable in view of at least the difference.

* * * * *